US010841867B2

(12) United States Patent
Ding et al.

(10) Patent No.: US 10,841,867 B2
(45) Date of Patent: *Nov. 17, 2020

(54) NETWORK CONNECTION METHOD AND USER EQUIPMENT

(71) Applicant: Tencent Technology (Shenzhen) Company Limited, Guangdong (CN)

(72) Inventors: Haifeng Ding, Shenzhen (CN); Hanyun Liang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 56 days.

This patent is subject to a terminal disclaimer.

(21) Appl. No.: 16/021,834

(22) Filed: Jun. 28, 2018

(65) Prior Publication Data

US 2018/0310234 A1    Oct. 25, 2018

Related U.S. Application Data

(63) Continuation of application No. 15/165,533, filed on May 26, 2016, now Pat. No. 10,051,559, which is a (Continued)

(30) Foreign Application Priority Data

Apr. 28, 2014    (CN) .......................... 2014 1 0175694

(51) Int. Cl.
*H04W 48/16*    (2009.01)
*H04W 36/00*    (2009.01)
(Continued)

(52) U.S. Cl.
CPC ......... *H04W 48/16* (2013.01); *H04W 12/003* (2019.01); *H04W 12/06* (2013.01);
(Continued)

(58) Field of Classification Search
CPC ...... H04W 48/16; H04W 48/20; H04W 84/12
See application file for complete search history.

(56) References Cited

U.S. PATENT DOCUMENTS 9,064,265 B1 *  6/2015  Sheikh .................. G06Q 30/02
2006/0208088 A1   9/2006  Sekiguchi
(Continued)

FOREIGN PATENT DOCUMENTS

CN          102395216 A       3/2012
CN          102710420 A      10/2012
(Continued)

OTHER PUBLICATIONS

International Search Report in international application No. PCT/CN2015/077609, dated Jul. 30, 2015.
(Continued)

*Primary Examiner* — Kodzovi Acolatse
*Assistant Examiner* — Farhad Ali
(74) *Attorney, Agent, or Firm* — Oppedahl Patent Law Firm LLC

(57) ABSTRACT

It is described a network connection method and a user equipment. The method includes that a two-dimensional code is scanned to obtain a character string corresponding to the two-dimensional code; when the character string does not comprise a preset character string, it is determined that the two-dimensional code is a secure two-dimensional code, and two-dimensional code information is obtained according to the character string; the two-dimensional code information is decoded, to obtain data of a target access point; a configuration description file is obtained according to the data of the target access point, the configuration description file being used to connect to the target access point; and the configuration description file is installed into the user equipment, and after detecting the target access point, the target (Continued)

access point is connected to according to the configuration description file.

19 Claims, 10 Drawing Sheets

Related U.S. Application Data continuation of application No. PCT/CN2015/077609, filed on Apr. 28, 2015.

(51) Int. Cl.
*H04W 12/06* (2009.01)
*H04W 48/20* (2009.01)
*H04W 12/00* (2009.01)
*H04W 84/12* (2009.01)
*H04W 88/02* (2009.01)

(52) U.S. Cl.
CPC ....... *H04W 36/0077* (2013.01); *H04W 48/20* (2013.01); *H04W 12/00522* (2019.01); *H04W 84/12* (2013.01); *H04W 88/02* (2013.01)

(56) References Cited

U.S. PATENT DOCUMENTS

| | | |
|---|---|---|
| 2012/0211559 A1 | 8/2012 | Okuyama |
| 2013/0097711 A1* | 4/2013 | Basavapatna ....... H04L 63/1433 726/25 |
| 2013/0166916 A1 | 6/2013 | Wu et al. |
| 2013/0176956 A1 | 7/2013 | Yamamoto |
| 2014/0158762 A1* | 6/2014 | Gomez ................ H04L 51/32 235/380 |
| 2014/0162600 A1* | 6/2014 | Chang ................ H04W 12/06 455/411 |
| 2015/0230085 A1 | 8/2015 | Xue |
| 2016/0269394 A1* | 9/2016 | Zhong ................ H04W 48/14 |

FOREIGN PATENT DOCUMENTS

| | | |
|---|---|---|
| CN | 102724668 A | 10/2012 |
| CN | 103179640 A | 6/2013 |
| CN | 103200647 A | 7/2013 |
| CN | 103415012 A | 11/2013 |
| CN | 103442411 A | 12/2013 |
| JP | 2002073548 A | 3/2002 |
| JP | 2004320308 A | 11/2004 |
| JP | 2006157815 A | 6/2006 |
| JP | 2006261938 A | 9/2006 |
| JP | 2013143616 A | 7/2013 |
| JP | 2013207493 A | 10/2013 |
| WO | 2011052778 A1 | 5/2011 |
| WO | 2015008144 A2 | 1/2015 |
| WO | WO-2015008144 A2 * | 1/2015 |

OTHER PUBLICATIONS

English Translation of the Written Opinion of the International Search Authority in international application No. PCT/CN2015/077609, dated Jul. 30, 2015.

Supplementary European Search Report in European application No. 15786236.8, dated Mar. 28, 2017.

Notification of the First Office Action of Japanese application No. 2016-547882, dated Jul. 18, 2017.

* cited by examiner

NETWORK CONNECTION METHOD AND USER EQUIPMENT

CROSS REFERENCE TO RELATED APPLICATIONS

This application is a continuation application of U.S. application Ser. No. 15/165,533 filed on May 26, 2016, which is a continuation application of International Patent Application No.: PCT/CN2015/077609, filed on Apr. 28, 2015, which claims priority to Chinese Patent Application No.: 201410175694.2, filed on Apr. 28, 2014, the contents of all of which are hereby incorporated by reference in their entireties.

FIELD OF THE TECHNOLOGY

The present disclosure relates to the field of network technologies, and in particular, to a network connection method and a user equipment.

BACKGROUND OF THE DISCLOSURE

With popularity of a wireless-fidelity (Wi-Fi) technology, an increasing number of users implement network functions by using a Wi-Fi network, such as web page browsing, e-mail sending and receiving, music downloading, digital photo transmission, streaming media services, and online games. Therefore, a network connection method is needed to connect the Wi-Fi network before the Wi-Fi network is used, furthermore implementing the foregoing network functions, The existing technology provides a network connection method, in which a user needs to obtain a name and a password of the Wi-Fi network first, then search for the Wi-Fi network on a user equipment, and after finding the Wi-Fi network, enter a Wi-Fi connection interface, manually enter the Wi-Fi password, and connect to the Wi-Fi network after the password is successfully authenticated.

However, the network connection method needs to be manually completed, and an operation procedure is complex, which causes that the user equipment spends too much time to connect to the Wi-Fi network after detecting a target access point, and in a process of the manual operation, an input error may occur, reducing network connection efficiency.

SUMMARY

Embodiments of the present disclosure provide a network connection method and a user equipment. The technical solutions are as follows:

According to a first aspect, a network connection method is provided, the method including: scanning, by a user equipment, a two-dimensional code, to obtain a character string corresponding to the two-dimensional code; detecting whether the character string comprises a preset character string; and if the character string does not comprise the preset character string, determining that the two-dimensional code is secure two-dimensional code, and obtaining two-dimensional code information according to the character string; decoding the two-dimensional code information, to obtain data of a target access point; obtaining, by the user equipment, a configuration description file according to the data of the target access point, the configuration description file being used to connect to the target access point; and installing the configuration description file into the user equipment, and after detecting the target access point, connecting, by the user equipment, to the target access point according to the configuration description file.

According to a second aspect, a network connection method is provided, the method including: scanning, by a user equipment, a two-dimensional code, to obtain data of a target access point; obtaining, by the user equipment, a configuration description file from a server according to the data of the target access point, the configuration description file being used to connect to the target access point; when a signature used to indicate that the configuration description file is a trusty configuration description file is not received from the server, displaying a prompt interface, and prompting that the configuration description file is an untrusted configuration description file; according to an installation instruction triggered by a user, installing the configuration description file; and after detecting the target access point, connecting to the target access point according to the configuration description file.

According to a third aspect, a user equipment is provided, the user equipment including: a scanning module, configured to scan a two-dimensional code, to obtain a character string corresponding to the two-dimensional code; a processing module, configured to detect whether the character string comprises a preset character string; and if the character string does not comprise the preset character string, determine that the two-dimensional code is secure two-dimensional code, and obtain two-dimensional code information according to the character string; a decoding module, configured to decode the two-dimensional code information, to obtain data of a target access point; the processing module is further configured to obtain a configuration description file according to the data of the target access point, the configuration description file being used to connect to the target access point; an installation module, configured to install the configuration description file into the user equipment; and a connection module, configured to: after detecting the target access point, connect o the target access point according to the configuration description file.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

In order to make objectives, technical solutions and advantages of the present disclosure clearer, embodiments of the present disclosure are described in detail in the following with reference to accompanying drawings.

Figure 1:
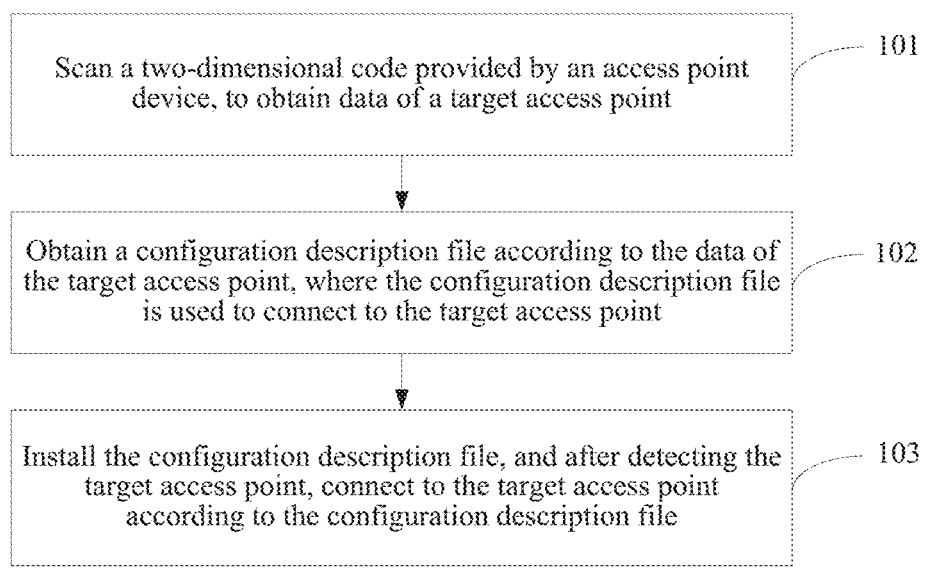
FIG. 1 is a flowchart of a network connection method according to an embodiment of the present disclosure.

FIG. 1 is a flowchart of a network connection method according to an embodiment of the present disclosure. As shown in FIG. 1, the method includes:

101: Scan two-dimensional code provided by an access point device, to obtain data of a target access point.

102: Obtain a configuration description file according to the data of the target access point, where the configuration description file is used to connect to the target access point.

103: Install the configuration description file, and after detecting the target access point, connect to the target access point according to the configuration description file.

The configuration description file includes a service set identifier of the target access point, an encryption manner of the target access point, and a password of the target access point.

Optionally, the method further includes:
scanning the two-dimensional code, to obtain a character string corresponding to the two-dimensional code;
performing security authentication on the character string, and detecting whether the character string includes a preset character string; and if the character string does not include the preset character string, determining that the two-dimensional code is secure two-dimensional code, and obtaining two-dimensional code information according to the character string; and
decoding the two-dimensional code information, to obtain the data of the target access point.

Optionally, the method further includes:
detecting a type identifier in the two-dimensional code information, and determining whether the two-dimensional code information includes the data of the target access point according to the type identifier; and if the two-dimensional code information includes the data of the target access point, performing the step of decoding the two-dimensional code information, to obtain the data of the target access point.

Optionally, the obtaining a configuration description file according to the data of the target access point further includes:
sending the data of the target access point to the server according to a server address in the two-dimensional code information, so that after receiving the data of the target access point, the server generates the configuration description file according to the data of the target access point, and sends the configuration description file to a user equipment.

Optionally, the method further includes:
receiving a signature sent by the server, where the signature is used to indicate that the configuration description file is a trusty configuration description file.

Optionally, if the signature sent by the server is not received, before the installing the configuration description file, the method further includes:
displaying a prompt interface, and prompting that the configuration description file is an untrusted configuration description file; and
according to an installation instruction triggered by a user, continuing to perform the step of installing the configuration description file.

Optionally, the installing the configuration description file includes:
opening the configuration description file by using a preset program, jumping to a system configuration interface, and installing the configuration description file by using the system configuration interface.

Optionally, the after detecting the target access point, connecting to the target access point according to the configuration description file includes:
detecting whether the service set identifier is the service set identifier of the target access point in the configuration description file; and, if the service set identifier is the service set identifier of the target access point, connecting to the target access point by using the encryption manner of the target access point and the password of the target access point in the configuration description file.

Embodiments of the present disclosure provide a network connection method and a user equipment, scanning two-dimensional code provided by an access point device, to obtain data of a target access point; obtaining a configuration description file according to the data of the target access point, the configuration description file being used to connect to the target access point; and installing the configuration description file, and after detecting the target access point, connecting to the target access point according to the configuration description file.

In this embodiment of the present disclosure, a configuration description file of a closed system is generated by using data of a target access point in two-dimensional code, so that the data of the target access point may be installed in the system by using the configuration description file, which thereby enables a user equipment to automatically connect to the target access point after detecting the target access point, and thereby avoids a manual operation to connect to the target access point, simplifying an operation procedure, and improving connection efficiency.

Figure 2:
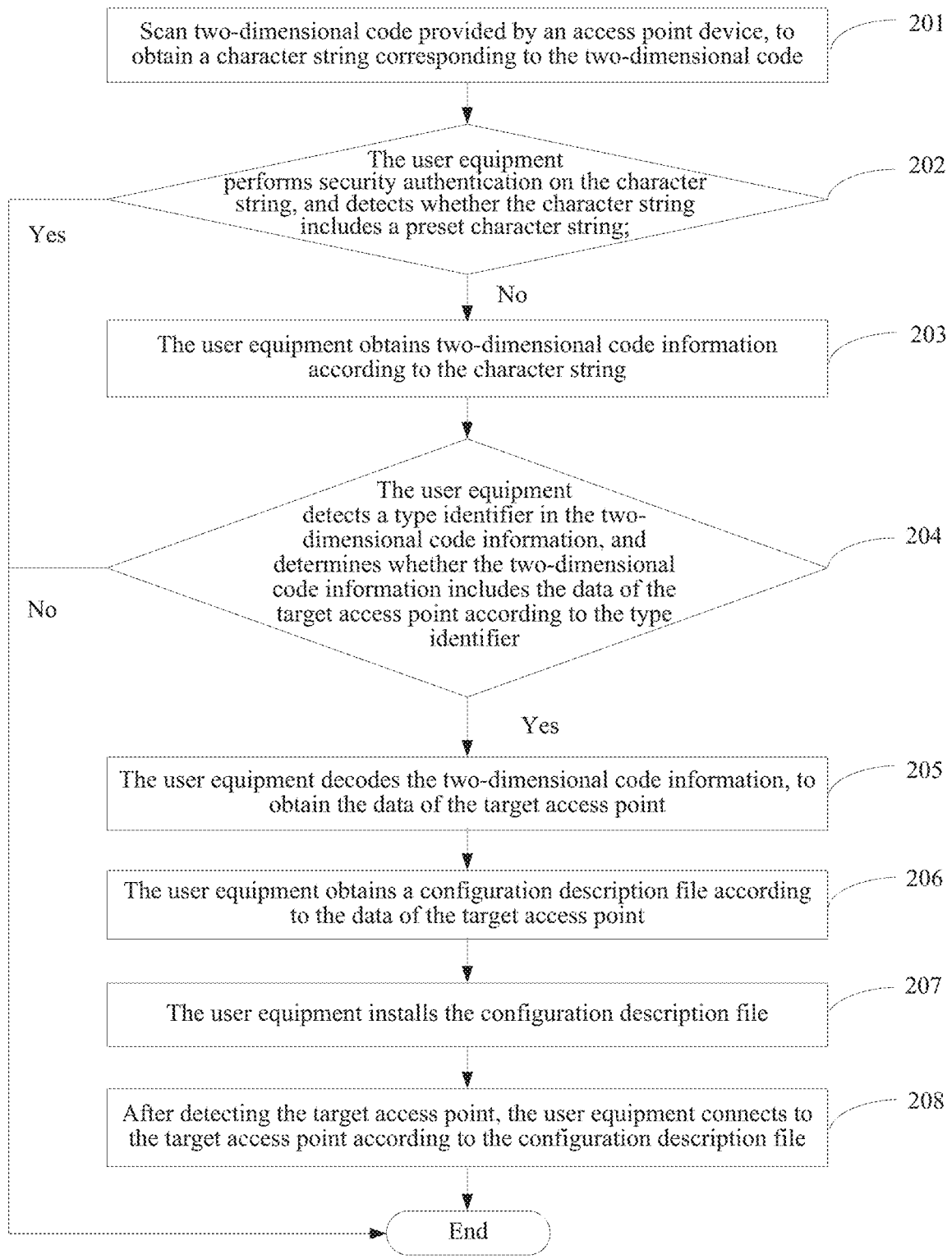
FIG. 2 is a flowchart of a network connection method according to an embodiment of the present disclosure.

FIG. 2 is a flowchart of a network connection method according to an embodiment of the present disclosure. In this embodiment, a user equipment may be a mobile phone, a tablet computer, or the like, where an operating system of the user equipment is a closed system, such as an iOS, and an access point may be a Wi-Fi hotspot, or the like. As shown in FIG. 2, the method includes:

201: Scan two-dimensional code provided by an access point device, to obtain a character string corresponding to the two-dimensional code.

The user equipment may scan a picture that includes the two-dimensional code by starting a framing window of the user equipment, to obtain the two-dimensional code. Specifically, the picture may be printed on a surface of the access point device, or printed on another medium that may be used for picture printing, such as paper, plank, or glass, and then the medium on which the picture is printed is pasted onto the surface of the access point device or another location, to remind a user to scan the picture.

Figure 3:
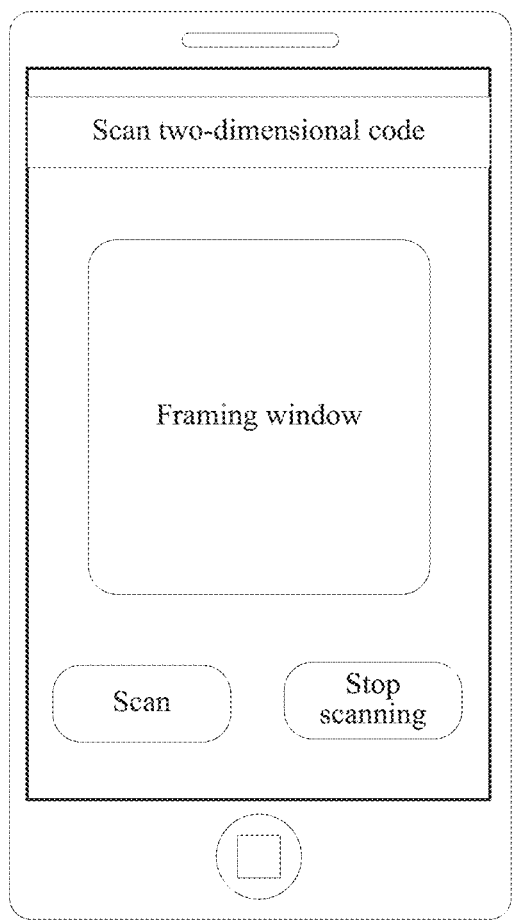
FIG. 3 is a schematic diagram of a display interface according to an embodiment of the present disclosure.
Figure 4:
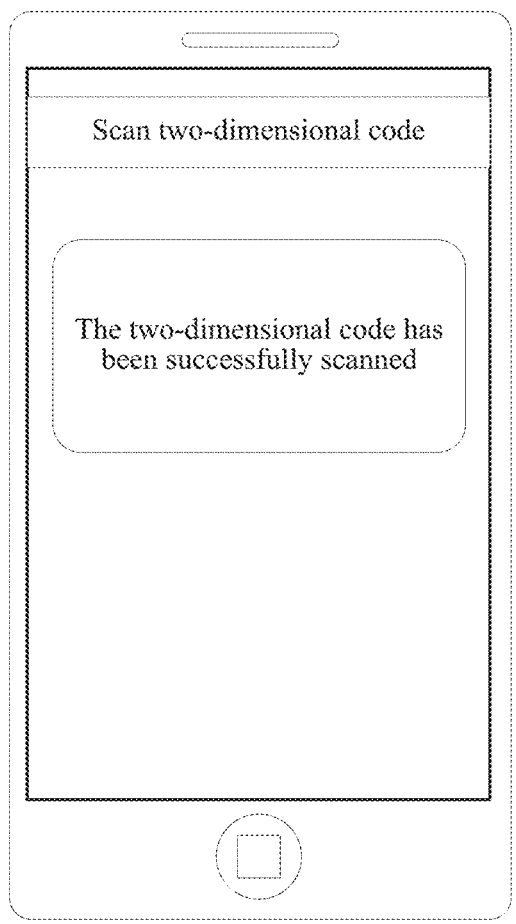
FIG. 4 is a schematic diagram of a display interface according to an embodiment of the present disclosure.

A two-dimensional code scanning interface may be shown in FIG. 3. In FIG. 3, the two-dimensional code scanning interface may include a framing window, a scanning icon, and a scanning stop icon, where the framing window is used to scan a picture, the scanning icon includes text information "Scan", and when the user selects the scanning icon, the user equipment starts to scan a photo that includes the two-dimensional code; and the scanning stop icon includes text information "Stop scanning", and when the user selects the scanning stop icon, the user equipment stops scanning the photo that includes the two-dimensional code, and displays a prompt interface after obtaining the two-dimensional code, to prompt the user that the two-dimensional code has been successfully obtained. As shown in FIG. 4, in FIG. 4, the prompt interface includes text information "The two-dimensional code has been successfully scanned", used to prompt the user equipment that the two-dimensional code has been successfully obtained.

Alternatively, the user equipment may also receive a picture that includes the two-dimensional code, which is sent by another device by using an instant messaging application, Bluetooth, or the like, where the another device may be another user equipment, another network device, or the like, which is not limited herein, and then scans the picture,to obtain the two-dimensional code of the access point.

202: The user equipment performs security authentication on the character string, and detects whether the character string includes a preset character string; if the character string does not include the preset character string, determines that the two-dimensional code is secure two-dimensional code, and accordingly perform 203; or if the character string includes the preset character string, determines that the two-dimensional code is insecure two-dimensional code, and ends.

Exemplarily, the preset character string may be a malicious link, and specifically a manner of the security authentication may be that:

the user equipment may determine whether the character string includes the preset character string according to a preset character string database prestored on the user equipment, or the user equipment may upload the character string to a server, and the server determines whether the character string includes the preset character string according to the preset character string database, and sends a determining result to the user equipment.

If it is determined that the character string does not include the preset character string, the two-dimensional code is determined to be secure two-dimensional code, and 203 and subsequent steps are performed.

Figure 5:
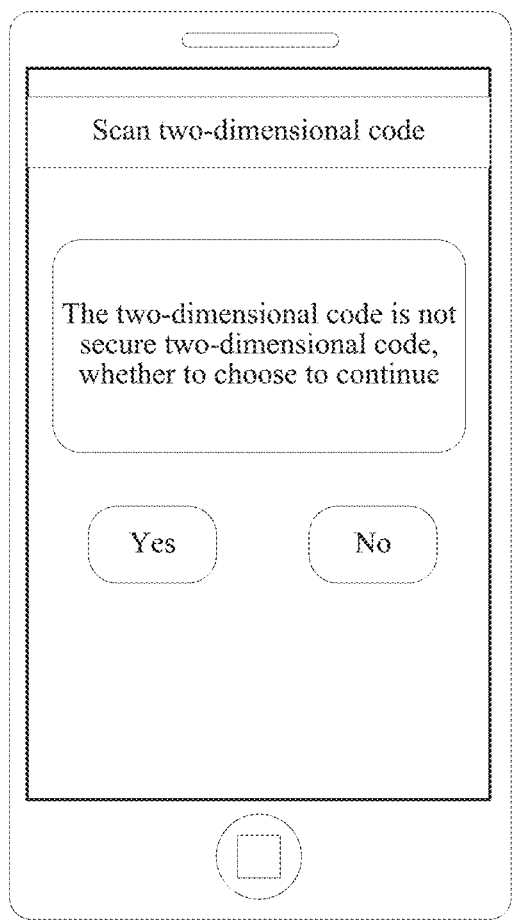
FIG. 5 is a schematic diagram of a display interface according to an embodiment of the present disclosure.

If it is determined that the character string includes the preset character string, it is determined that the two-dimensional code is insecure two-dimensional code, and the prompt interface is displayed to the user, prompting that the two-dimensional code is secure two-dimensional code, and prompting the user whether to continue the decoding, as shown in FIG. 5. In FIG. 5, the prompt interface includes a prompt icon, a continuing icon, and a stop icon, where the prompt icon includes text information "The two-dimensional code is not secure two-dimensional code, whether to choose to continue", used to prompt that the two-dimensional code is insecure two-dimensional code, and prompt the user whether to continue to decode the two-dimensional code; the continuing icon includes text information "Yes", and if the user select the continuing icon, 203 and the subsequent steps are performed; and the stop icon includes text information "No", and if the user selects the stop icon, the procedure ends,

203: The user equipment obtains two-dimensional code information according to the character string.

Specifically, the character string may be decoded by using a protocol, to obtain the two-dimensional code information, where the two-dimensional code information may be Java Script Object Notation (JSON, which is a lightweight data exchange format based on the Java Script language), and the JSON data includes a type identifier, where the type identifier is used to indicate a type of the JSON data. Different types of the JSON data correspond to different type identifiers, the type of the JSON data may be access point data, or may be name card data, network link data, or the like, or may be another type, which is not limited herein.

It is noteworthy that, the protocol used when the character string is decoded may be a protocol having a decoding function. The specific protocol is not limited herein, and data obtained by using the protocol to decode the character string may be the JSON data, or may be another type of data based on the Java language, or may be data in another format, which is not limited herein.

204: The user equipment detects a type identifier in the two-dimensional code information, and determines whether the two-dimensional code information includes the data of the target access point according to the type identifier; and if the two-dimensional code information includes the data of the target access point, performs 205; or if the two-dimensional code information does not include the data of the target access point, the procedure ends.

Specifically, the user equipment detects the type identifier in the JSON data, and determines whether the JSON data includes the data of the target access point according to the type identifier in the JSON data, A specific determining manner may be type identifier matching, and determining whether the JSON data includes the data of the target access point may also be determining whether the JSON data includes the data of the target access point by using a preset algorithm, which is not limited herein.

Optionally, in this embodiment, step 202 is performing security authentication on the two-dimensional code, and step 204 is determining the type of the data included in the two-dimensional code; and in an actual application, step 202 and step 204 may also be not included.

205: The user equipment decodes the two-dimensional code information, to obtain the data of the target access point.

Specifically, after the two-dimensional code information is decoded, the data of the target access point may be obtained, and the data of the target access point may include a target access point parameter such as a service set identifier (SSID) of the target access point, an encryption manner of the target access point, or a password of the target access point, where the encryption manner of the target access point may include wired equivalent privacy (WEP) encryption, wired equivalent privacy-pre-shared key (WPA-PSK) encryption, 2 wired equivalent privacy-pre-shared key (WPA2-PSK) encryption, and wireless LAN authentication and privacy infrastructure (WAPI) encryption, which are not limited herein.

The data of the target access point may be provided by the access point device, and is configured on the access point device, or may be provided on a network side, and is configured on the server. If the data of the target access point is provided by the access point device, the two-dimensional code may be printed on the surface of the access point device, or another medium on which the two-dimensional code is printed; or if the data of the target access point is provided on the network side, the two-dimensional code may be received from the network side by the user equipment.

206: The user equipment obtains a configuration description file according to the data of the target access point.

Specifically, the user equipment generates the configuration description file according to the data of the target access point; and a specific generation manner may be generating the configuration description file by using a configuration description file generation algorithm, or may be another manner, which is not limited herein. The configuration description file is generated by the user equipment, and the user equipment may not have a right to configure a signature; and therefore the configuration description file does not include the signature.

If the configuration description file is generated by the server, the configuration description file includes the signature, indicating that the configuration description file is a trusty configuration description file.

Optionally, the user equipment may also send, according to a uniform resource locator (URL) obtained by parsing the two-dimensional code, the data of the target access point to an authorized server according to the URL; the authorized server generates the configuration description file according to the data of the target access point; and after generating the configuration description file, the server sends the configuration description file to the user equipment. A specific generation manner may be that the authorized server generates the configuration description file by using the configuration description file generation algorithm of the authorized server, or may be another manner, which is not limited herein.

It is noteworthy that, the configuration description file may include the target access point parameter such as the SSW of the target access point, the encryption manner of the target access point, or the password of the target access point.

A closed system can configure the closed system only by using the configuration description file. Therefore, the data of the target access point can be stored into the system only by generating the configuration description file including the data of the target access point according to the data of the target access point by performing step 206.

207: The user equipment installs the configuration description file.

In this embodiment of the present disclosure, description is provided only by using an example in which the configuration description file to be installed by the user equipment is a configuration description file that does not include the signature.

The user equipment starts a preset program, and opens the configuration description file in the preset program, where the preset program may be a browser, or may be another program, which is not limited herein.

Figure 6:
FIG. 6 is a schematic diagram of a display interface according to an embodiment of the present disclosure.

After the configuration description file is opened, a configuration interface is jumped to, as shown in FIG. 6. In FIG. 6, the configuration interface includes: an installation interface and a configuration description file content interface, where the installation interface includes an installation icon, and the installation icon includes name information "Install the configuration description file". When the user selects the installation icon, the user equipment installs the configuration description file, and the name information includes text information "Wi-Fi network", used to indicate that the configuration description file is an access point configuration description file.

Figure 7:
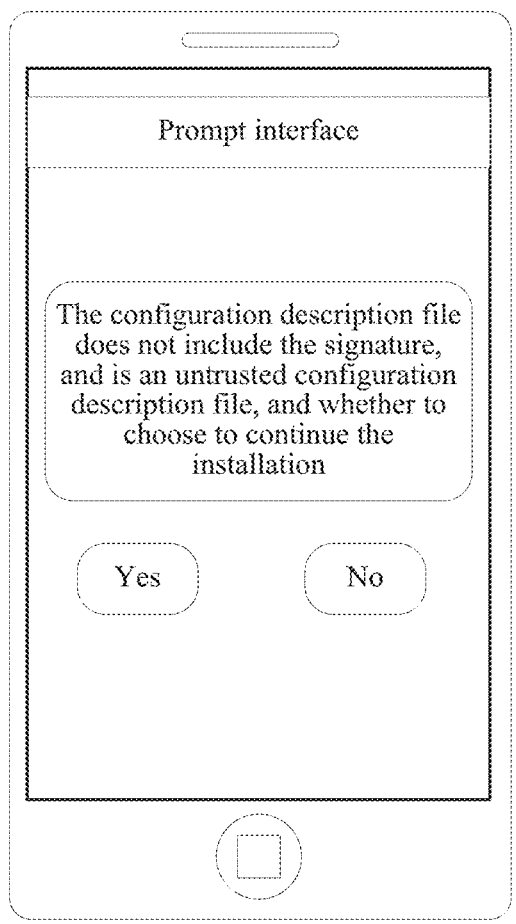
FIG. 7 is a schematic diagram of a display interface according to an embodiment of the present disclosure.

The configuration description file does not include the signature, and therefore when the user chooses the installation, the user equipment displays a prompt interface, prompting that the configuration description file does not include the signature, and is an untrusted configuration description file, and whether to choose to continue the installation, as shown in FIG. 7. In FIG. 7, the prompt interface includes prompt information, an installation icon, and an installation stop icon, where the prompt information includes text information "The configuration description file does not include the signature, and is an untrusted configuration description file, and whether to choose to continue the installation", the installation icon includes text information "Yes", and the installation stop icon includes text information "No". If the user equipment detects that selection of the installation icon is triggered, the installation interface is displayed, as shown in FIG. 8, so that the user installs the configuration description file according to the installation interface; or if the user equipment detects that the installation stop icon is triggered, the procedure ends.

Figure 8:
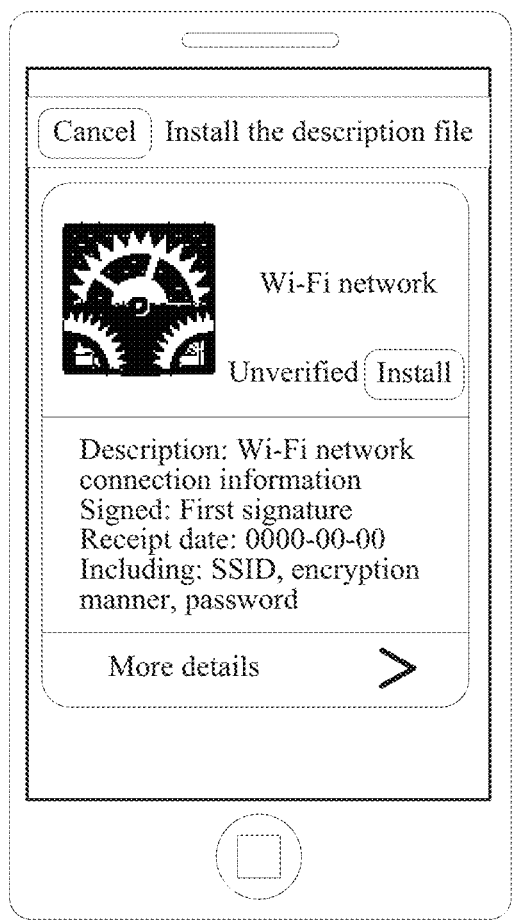
FIG. 8 is a schematic diagram of a display interface according to an embodiment of the present disclosure.

In FIG. 8, the installation interface includes an installation prompt interface, an installation cancellation icon, an installation content interface, where the installation prompt interface includes text information "Install the description file", the installation cancellation icon includes text information "Cancel", and the installation content interface includes an installation icon, an information display icon, text information "Description: Wi-Fi network connection information", "Signature: None", "Unverified", "Receipt date: 0000-00-00", "Including: SSID, encryption manner, and password", and "More details". When detecting that the installation icon is triggered, the user equipment installs the configuration description file. When detecting that the installation cancellation icon is triggered, the user equipment ends the procedure.

If the configuration description file includes the signature, the installation interface is displayed, so that the user installs the configuration description file according to the installation interface.

208: After detecting the target access point, the user equipment connects to the target access point according to the configuration description file, and ends the procedure.

Specifically, after opening a scanning function, when detecting a service set identifier of any access point, the user equipment detects whether the service set identifier is a service set identifier of the target access point in the configuration description file. The configuration description file has been installed in the system. Therefore, after determining that the service set identifier is the service set identifier of the target access point in the configuration description file, the user equipment may connect to the target access point according to the target access point parameter such as the SSID of the target access point, the encryption manner of the target access point, or the password of the target access point.

Figure 9:
FIG. 9 is a schematic diagram of a display interface according to an embodiment of the present disclosure.

Optionally, after successfully installing the configuration description file, the user equipment may further remove the configuration description file; and when the user removes the configuration description file from a system configuration, the user equipment displays a configuration description file removal interface, as shown in FIG. 9. In FIG. 9, if the user selects a removal icon that includes text information "Remove", and after the user equipment selects the removal icon, the configuration description file is removed from the device. Except for the removal icon and text information "Remove the configuration description file", another interface, another icon, and other text information in FIG. 9 are the same as those in FIG. 8. Details are not provided herein.

It is noteworthy that, the two-dimensional code scanning interface, the prompt interface, the configuration description file interface, the configuration interface, the installation interface, and the removal interface in this embodiment of the present disclosure are only exemplary, and may also be in another form, which is not limited herein.

In this embodiment of the present disclosure, a configuration description file of a closed system is generated by using data of a target access point in two-dimensional code, so that the data of the target access point may be installed in the system by using the configuration description file, which thereby enables a user equipment to automatically connect to the target access point after detecting the target access point, and thereby avoids a manual operation to connect to the target access point, simplifying an operation procedure, and improving connection efficiency. Further, security authentication is performed on the two-dimensional code, and a server attaches a signature to the configuration description file, ensuring security of the user equipment when connecting to the target access point.

Figure 10:
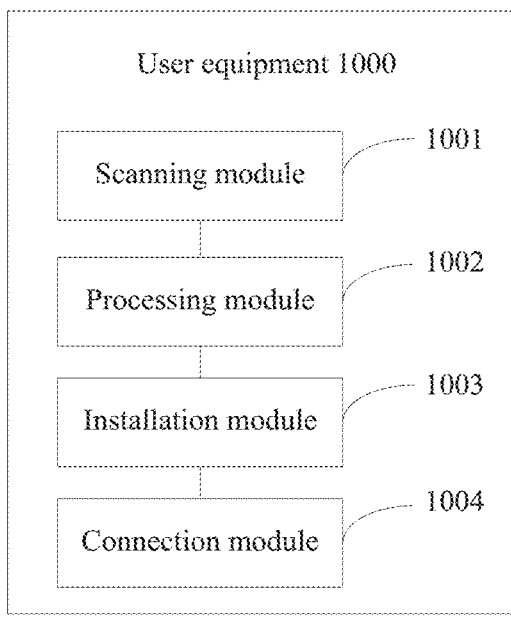
FIG. 10 is a schematic structural diagram of a user equipment according to an embodiment of the present disclosure.

FIG. 10 is a user equipment 1000 according to an embodiment of the present disclosure. As shown in FIG. 10, the user equipment 1000 includes:
- a scanning module 1001, configured to scan a two-dimensional code provided by an access point device, to obtain data of a target access point;
- a processing module 1002, configured to obtain a configuration description file according to the data of the target access point, where the configuration description file is used to connect to the target access point;
- an installation module 1003, configured to install the configuration description file; and
- a connection module 1004, configured to: after detecting the target access point, connect to the target access point according to the configuration description file,
- where, the configuration description file includes a service set identifier of the target access point, an encryption manner of the target access point, and a password of the target access point.

Figure 11:
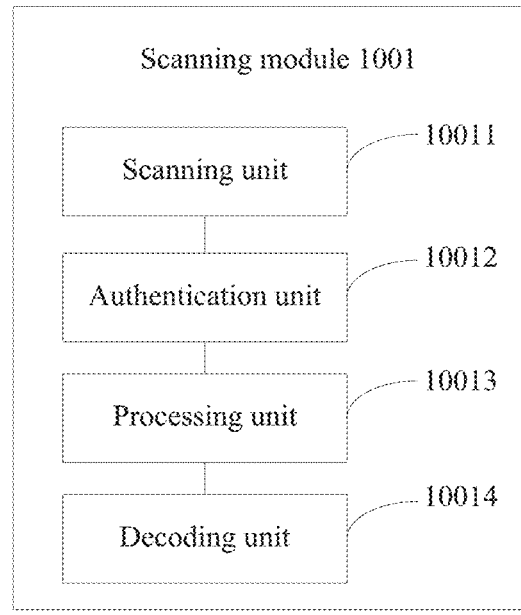
FIG. 11 is a schematic structural diagram of a user equipment according to an embodiment of the present disclosure.

Optionally, as shown in FIG. 11, the scanning module 1001 includes:
- a scanning unit 10011, configured to scan the two-dimensional code, to obtain a character string corresponding to the two-dimensional code;
- an authentication unit 10012, configured to perform security authentication on the character string, and detect whether the character string includes a preset character string;
- a processing unit 10013, configured to: if the character string does not include the preset character string, determine that the two-dimensional code is secure two-dimensional code, and obtain two-dimensional code information according to the character string; and
- a decoding unit 10014, configured to decode the two-dimensional code information, to obtain the data of the target access point.

Optionally, the processing unit 10013 is further configured to detect a type identifier in the two-dimensional code information, and determine whether the two-dimensional code information includes the data of the target access point according to the type identifier; and if the two-dimensional code information includes the data of the target access point, trigger the decoding unit to perform the step of decoding the two-dimensional code information, to obtain the data of the target access point.

Optionally, the user equipment 1000 further includes a sending module 1005, configured to send the data of the target access point to the server according to a server address in the two-dimensional code information, so that after receiving the data of the target access point, the server generates the configuration description file according to the data of the target access point, and sends the configuration description file to a user equipment.

Optionally, the user equipment 1000 further includes a receiving module 1006, configured to receive a signature sent by the server, where the signature is used to indicate that the configuration description file is a trusty configuration description file.

Optionally, the user equipment 1000 further includes a display module 1007, configured to: according to an installation instruction triggered by a user, trigger the installation module 1003 to continuing to perform the step of installing the configuration description file.

Optionally, the installation module is configured to open the configuration description file by using a preset program, jump to a system configuration interface, and install the configuration description file by using the system configuration interface.

Optionally, the connection module is configured to detect whether the service set identifier is the service set identifier of the target access point in the configuration description file; and
- and if the service set identifier is the service set identifier of the target access point, connect to the target access point by using the encryption manner of the target access point and the password of the target access point in the configuration description file.

In this embodiment of the present disclosure, a configuration description file of a closed system is generated by using data of a target access point in two-dimensional code, so that the data of the target access point may be installed in the system by using the configuration description file, which thereby enables a user equipment to automatically connect to the target access point after detecting the target access point, and thereby avoids a manual operation to connect to the target access point, simplifying an operation procedure, and improving connection efficiency.

It should be noted that the foregoing functional modules are only described for exemplary purposes during a network connection for the user equipment that is provided in the foregoing embodiments. In actual applications, the functions may be allocated to different functional modules according to specific needs, which means that the internal structure of the apparatus is divided to different functional modules to complete all or some of the above described functions. In addition, the user equipment provided in the foregoing embodiments and the network connection method belong to a same conception. Refer to the method embodiments for details about a specific implementation process. Details are not provided again herein.

Figure 12:
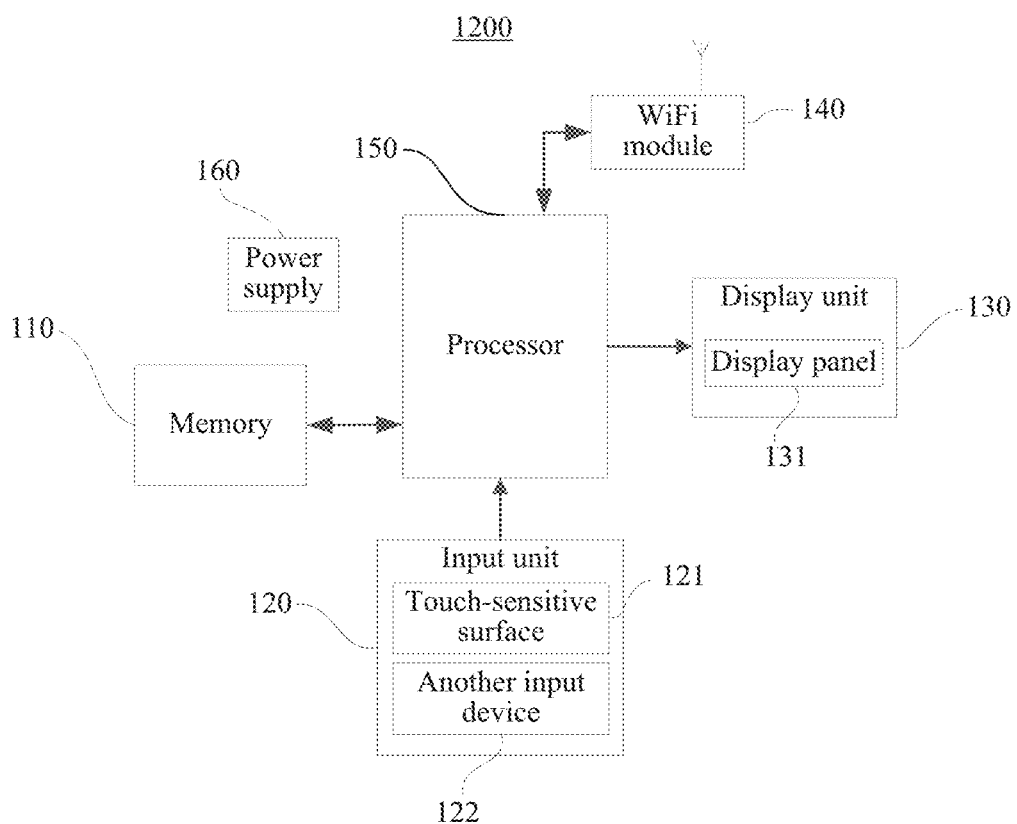
FIG. 12 is a schematic structural diagram of a user equipment according to an embodiment of the present disclosure.

FIG. 12 shows a schematic structural diagram of a terminal having a touch-sensitive surface involved in an embodiment of the present disclosure. The terminal may execute the foregoing network connection method, Refer to FIG. 12, specifically speaking:

A terminal 1200 may include components such as a memory 110 including one or more computer readable storage media, an input unit 120, a display unit 130, a wireless fidelity (WiFi) module 140, a processor 150 including one or more processing cores, and a power supply 160. A person of skill in the art can understand that, a structure of the terminal shown in FIG. 12 does not constitute a limit on the terminal, and may include components that are more or fewer than those shown in the figure, or a combination of some components, or different component arrangements.

The memory 110 may be configured to store a software program and module. The processor 150 runs the software program and module stored in the memory 110, to implement various functional applications and data processing. The memory 110 may mainly include a program storage area and a data storage area, where the program storage area may store the operating system, the application program required by at least one function (two-dimensional code scanning, image display function, and the like), and the like; and the data storage area may store the data (two-dimensional code data, access point data, and the like) created according to usage of the terminal 1200, and the like, In addition, the memory 110 may include a high speed random access memory, and may further include a non-volatile memory, for example, at least one disk memory, a Flash memory, or another volatile solid-state memory. Accordingly, the memory 110 may further include a memory controller, to provide access to the memory 110 by the processor 150 and the input unit 120.

The input unit 120 may be configured to receive inputted digit or character information, and generate a keyboard, a mouse, a joystick, an optical, or a trackball signal input related to user setting and function control. Specifically, the input unit 120 may include a touch-sensitive surface 121 and another input device 122. The touch-sensitive surface 121 may also be referred to as a touch screen or a touch panel, and may collect a touch operation of a user on or near the touch-sensitive surface (such as an operation of a user on or near the touch-sensitive surface 121 by using any suitable object or attachment, such as a finger or a touch pen), and drive a corresponding connection apparatus according to a preset program. Optionally, the touch-sensitive surface 121 may include two parts: a touch detection apparatus and a touch controller, The touch detection apparatus detects a touch direction of the user, detects the signal brought by a touch operation, and transmits the signal to the touch controller; and the touch controller receives touch information from the touch check device, converts the touch information to touch coordinates, and sends the touch coordinates to the processor 150, and may receive and execute a command sent by the processor 150. In addition, the touch-sensitive surface 121 may be implemented by using various types, such as a resistive type, a capacitance type, an infrared type, and a surface sound wave type. Besides the touch-sensitive surface 121, the input unit 120 may further include the another input device 122. Specifically, the another input device 122 may include but is not limited to one or more of a physical keyboard, a function key (for example, a volume control key and a switch key), a track ball, a mouse, a joystick, and the like.

The display unit 130 may be configured to display information inputted by a user, information provided for the user, and various graphical user interfaces of the terminal 1200, where these graphical user interfaces may be constituted by an image, a text, an icon, and any combination of them. The display unit 130 may include a display panel 131, and optionally, the display panel 131 may be configured in a form, such as an LCD (Liquid Crystal Display, liquid crystal display), an OLED (Organic Light-Emitting Diode, organic light-emitting diode), and the like. Further, the touch-sensitive surface 121 may cover the display panel 131; after the touch-sensitive surface 121 detects the touch operation on it or nearby, the touch panel transmits the touch operation to the processor 150 to determine the type of a touch event, and then the processor 150 provides corresponding visual input on the display panel 131 according to the type of the touch event. Although in FIG. 12, the touch-sensitive surface 121 and the display panel 131 implement input and output functions as two independent components, in some embodiments, the touch-sensitive surface 121 and the display panel 131 may be integrated to implement the input and output functions.

WiFi is a short distance wireless transmission technology; and by using the WiFi module 140, the terminal 1200 can help the user receive and send an email, browse a Web page, visit streaming media, and so on, and it provides wireless broadband Internet visit for the user. Although FIG. 12 shows the WiFi module 140, it may be understood that, the WiFi module 170 is not a necessary component of the terminal 1200, and may completely be omitted as required in a range in which an essence of the disclosure is not changed.

The processor 150 is a control center of the terminal 1200, connects each part of an entire mobile phone by using various interfaces and lines, and performs various functions of the terminal 1200 and processes data by running or executing a software program and/or a module stored in the memory 110 and invoking the data stored in the memory 110, thereby performing overall monitoring on the mobile phone. Optionally, the processor 150 may include one or more processing cores; and preferably, an application processor and a modem processor may be integrated into the processor 150, where the application processor mainly processes an operating system, a user interface, an application program, and the like, and the modem processor mainly processes a radio communication. It can be understood that, the foregoing modulation and demodulation processor may also not be integrated into the processor 150.

The terminal 1200 further includes the power supply 160 (for example, a battery) for supplying power for components, preferably, the power supply may be logically connected to the processor 150 by using a power supply management system, so that management of a function such as charging, discharging, and power consumption is implemented by using the power supply management system. The power supply 160 may further include any component, such as one or more direct current or alternate current power supplies, a re-charging system, a power supply fault detection circuit, a power supply converter or an inverter, and a power supply state indicator.

The terminal 1200 may further include a camera, a Bluetooth module, and the like, which are although not shown in the figure. Details are not provided again herein. Specifically, in this embodiment, the display unit of the terminal is a touch screen display, and the terminal includes the memory and one or more programs, where the one or more programs are stored in the memory and are configured, so that the one or more programs execute an instruction of the foregoing network connection method.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A network connection method, comprising:
   scanning, by a user equipment, a two-dimensional code, to obtain a character string corresponding to the two-dimensional code;
   when the character string does not comprise a preset character string, determining that the two-dimensional code is a secure two-dimensional code, and obtaining two-dimensional code information according to the character string;
   decoding the two-dimensional code information, to obtain data of a target access point;
   obtaining, by the user equipment, a configuration description file according to the data of the target access point, the configuration description file being used to connect to the target access point; and
   installing the configuration description file into the user equipment, and after detecting the target access point, connecting, by the user equipment, to the target access point according to the configuration description file,
   wherein obtaining the configuration description file according to the data of the target access point comprises:
   sending the data of the target access point to a server according to a server address in the two-dimensional code information, so that after receiving the data of the target access point, the server generates the configuration description file according to the data of the target access point, and sends the configuration description file to the user equipment,
   and wherein the method further comprises:
   detecting a Java Script Object Notation (JSON) type identifier in the two-dimensional code information, and determining whether the two-dimensional code information comprises the data of the target access point according to the JSON type identifier; and in response to the two-dimensional code information comprises the data of the target access point, performing the step of decoding the two-dimensional code information, to obtain the data of the target access point.

2. The method according to claim 1, further comprising:
   receiving a signature sent by the server, wherein the signature is used to indicate that the configuration description file is a trusty configuration description file.

3. The method according to claim 2, wherein if the signature sent by the server is not received, before the installing the configuration description file, the method further comprises:
   displaying a prompt interface, and prompting that the configuration description file is an untrusted configuration description file; and
   according to an installation instruction triggered by a user, continuing to perform the step of installing the configuration description file.

4. The method according to claim 3, wherein the installing the configuration description file comprises:
   opening the configuration description file by using a preset program, jumping to a system configuration interface, and installing the configuration description file by using the system configuration interface.

5. The method according to claim 1, wherein the installing the configuration description file comprises:
   opening the configuration description file by using a preset program, jumping to a system configuration interface, and installing the configuration description file by using the system configuration interface.

6. The method according to claim 1, wherein the configuration description file comprises a service set identifier of the target access point, an encryption manner of the target access point, and a password of the target access point,
   and after detecting the target access point, connecting to the target access point according to the configuration description file comprises:
   detecting whether a service set identifier is the service set identifier of the target access point in the configuration description file; and if the service set identifier is the service set identifier of the target access point, connecting to the target access point by using the encryption manner of the target access point and the password of the target access point in the configuration description file.

7. The method according to claim 1, further comprising:
   when the character string comprises the preset character string, determining that the two-dimensional code is an insecure two-dimensional code;
   prompting whether to continue to decode the two-dimensional code; and
   according to a continuing decoding instruction triggered by a user, obtaining two-dimensional code information according to the character string, decoding the two-dimensional code information, to obtain the data of the target access point.

8. The method according to claim 1, wherein the preset character string is pre-stored on the user equipment, and the method further comprises: detecting, by the user equipment, whether the character string comprises the preset character string to determine whether the two-dimensional code is a secure two-dimensional code; or wherein the preset character string is pre-stored on a server, and the method further comprises: determining, by the server, whether the character string comprises the preset character string to determine whether the two-dimensional code is a secure two-dimensional code, and sending a determining result to the user equipment.

9. A network connection method, comprising:
   scanning, by a user equipment, a two-dimensional code, to obtain data of a target access point;
   obtaining, by the user equipment, a configuration description file from a server according to the data of the target access point, the configuration description file being used to connect to the target access point;
   when a signature indicating that the configuration description file is a trusty configuration description file is not received from the server, displaying, by the user equipment, a prompt interface for prompting that the configuration description file is an untrusted configuration description file;
   according to an installation instruction triggered by a user, installing, by the user equipment, the configuration description file; and
   after detecting the target access point, connecting, by the user equipment, to the target access point according to the configuration description file,
   wherein scanning the two-dimensional code, to obtain the data of the target access point comprises:
   scanning the two-dimensional code, to obtain a character string corresponding to the two-dimensional code;
   obtaining two-dimensional code information according to the character string; and
   decoding the two-dimensional code information, to obtain the data of the target access point,
   and wherein the method further comprises:

detecting a Java Script Object Notation (JSON) type identifier in the two-dimensional code information, and determining whether the two-dimensional code information comprises the data of the target access point according to the JSON type identifier; and in response to the two-dimensional code information comprises the data of the target access point, performing the step of decoding the two-dimensional code information, to obtain the data of the target access point.

10. The method according to claim 9, further comprising: when the signature is received from the server, displaying an installation interface, so that the user installs the configuration description file according to the installation interface.

11. The method according to claim 9, wherein the obtaining a configuration description file from a server according to the data of the target access point comprises:
sending the data of the target access point to the server according to a server address in the two-dimensional code information, so that after receiving the data of the target access point, the server generates the configuration description file according to the data of the target access point, and sends the configuration description file to the user equipment.

12. The method according to claim 9, wherein the installing the configuration description file comprises:
opening the configuration description file by using a preset program, jumping to a system configuration interface, and installing the configuration description file by using the system configuration interface.

13. The method according to claim 9, wherein the configuration description file comprising a service set identifier of the target access point, an encryption manner of the target access point, and a password of the target access point,
after detecting the target access point, connecting to the target access point according to the configuration description file comprises:
detecting whether a service set identifier is the service set identifier of the target access point in the configuration description file; and if the service set identifier is the service set identifier of the target access point, connecting to the target access point by using the encryption manner of the target access point and the password of the target access point in the configuration description file.

14. A user equipment, comprising:
a scanning module, configured to scan a two-dimensional code, to obtain a character string corresponding to the two-dimensional code;
a processing module, configured to, when the character string does not comprise a preset character string, determine that the two-dimensional code is a secure two-dimensional code, and obtain two-dimensional code information according to the character string; and
wherein the scanning module comprises a decoding unit, configured to decode the two-dimensional code information, to obtain data of a target access point, and wherein
the processing module is further configured to obtain a configuration description file according to the data of the target access point, the configuration description file being used to connect to the target access point;
the user equipment further comprising:
a sending module, configured to send the data of the target access point to a server according to a server address in the two-dimensional code information, so that after receiving the data of the target access point, the server generates the configuration description file according to the data of the target access point, and sends the configuration description file to the user equipment;
an installation module, configured to install the configuration description file into the user equipment; and
a connection module, configured to, after detecting the target access point, connect to the target access point according to the configuration description file,
wherein the scanning module comprises a processing unit, configured to detect a Java Script Object Notation (JSON) type identifier in the two-dimensional code information, and determine whether the two-dimensional code information comprises the data of the target access point according to the JSON type identifier; and in response to the two-dimensional code information comprises the data of the target access point, trigger the decoding unit to decode the two-dimensional code information, to obtain the data of the target access point.

15. The equipment according to claim 14, further comprising a receiving module, configured to receive a signature sent by the server, wherein the signature is used to indicate that the configuration description file is a trusty configuration description file.

16. The equipment according to claim 15, further comprising a display module, configured to:
when the receiving module does not receive the signature sent by the server, display a prompt interface, and prompt that the configuration description file is an untrusted configuration description file; and
according to an installation instruction triggered by a user, trigger the installation module to continue to install the configuration description file.

17. The equipment according to claim 16, wherein the installation module is configured to open the configuration description file by using a preset program, jump to a system configuration interface, and install the configuration description file by using the system configuration interface.

18. The equipment according to claim 14, wherein the installation module is configured to open the configuration description file by using a preset program, jump to a system configuration interface, and install the configuration description file by using the system configuration interface.

19. The equipment according to claim 14, wherein the configuration description file comprises a service set identifier of the target access point, an encryption manner of the target access point, and a password of the target access point,
and the connection module is configured to detect whether a service set identifier is the service set identifier of the target access point in the configuration description file; and if the service set identifier is the service set identifier of the target access point, connect to the target access point by using the encryption manner of the target access point and the password of the target access point in the configuration description file.

* * * * *